UNITED STATES PATENT OFFICE.

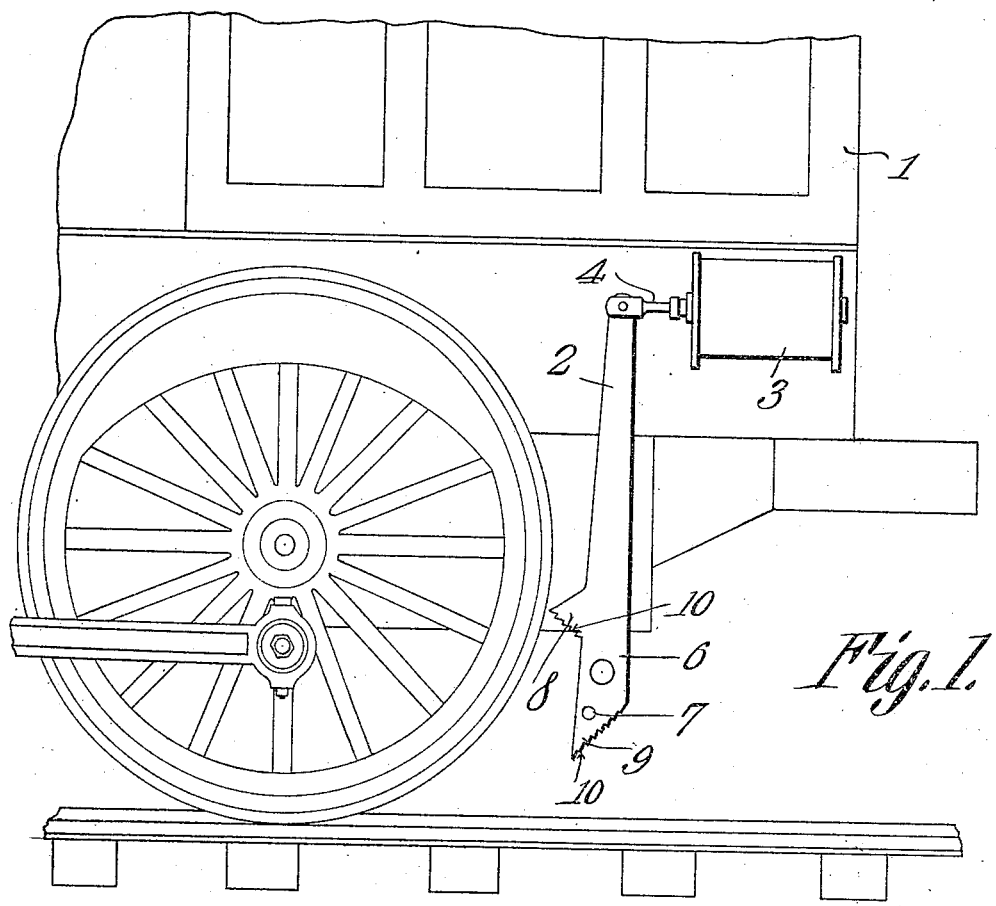
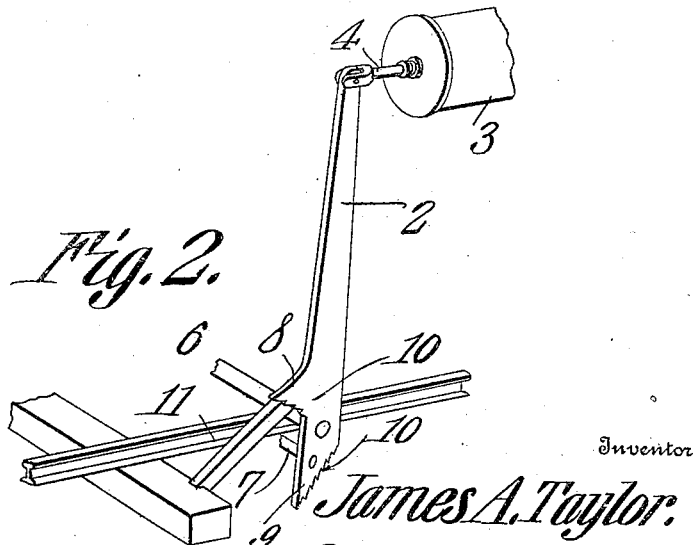

JAMES A. TAYLOR, OF BIRMINGHAM, ALABAMA.

ENGINE-MOVING BRAKE-LEVER.

943,715.                Specification of Letters Patent.    Patented Dec. 21, 1909.

Application filed February 19, 1909. Serial No. 478,978.

*To all whom it may concern:*

Be it known that I, JAMES A. TAYLOR, a citizen of the United States, residing at Birmingham, in the county of Jefferson and State of Alabama, have invented a new and useful Engine - Moving Brake - Lever, of which the following is a specification.

By way of explanation, I will state that in train operation it frequently happens that an engine, from break-down or other cause, becomes inoperative as an entity, the defect however, not involving the entire mechanism, but only so much thereof as is disposed upon one side of the locomotive. In such case, it is the common practice to cut out the cylinder or cylinders upon the side in which the defect exists and to run the engine to the terminal or to the nearest shop with the intact mechanism which is located upon the opposite side of the engine from that in which the defect exists. So long as the locomotive is in motion the above described operation may be relied upon to work satisfactorily, since the inertia of the moving parts will carry them past dead centers. When, however, the engine stops along the route, to take water or to receive orders, it is often found, when the start is sought to be made, that the parts are on center, the engine being stalled and unable to handle itself. In such case, pinch bars must be resorted to to move the engine sufficiently to throw the parts off center, but since a heavy locomotive cannot be stirred by pinch bars, particularly if some of the wheels have settled into a low joint in the track, it not infrequently becomes necessary to telegraph for another locomotive, not for the purpose of towing the disabled locomotive to its destination, but merely to move the latter a few inches, to displace the parts off center, in which position it is then capable of handling itself.

It is the object of this invention to provide means whereby a locomotive engine which is on center, may, by its own power, be moved a short distance, whereby the parts may be thrown off center, and be placed in a position effective to receive steam; and to this end, I equip the locomotive with a driver brake lever of novel and improved construction, and provide for use therewith, earth or track engaging means, whereby, when the driver brake is moved, the locomotive will be thrust forward or backward sufficient to throw the parts off center.

The different makes and types of locomotives now in use are built to use a driver brake lever peculiar to the particular make or type, each of said levers differing slightly in form and in outline, all, however, having a common function, and being similarly disposed relative to the other parts of the locomotive and to the track. In view of this divergence in structural detail, it is to be understood that, within the scope of what I shall hereinafter claim, divers changes in the form, proportions, size and minor details of the device may be made without departing from the spirit or sacrificing any of the advantages of the invention.

Similar numerals of reference are employed to denote corresponding parts throughout both figures of the drawings.

In the accompanying drawings:—Figure 1 shows in side elevation a portion of a locomotive engine equipped with a driver brake lever constructed in accordance with my invention; Fig. 2 shows my invention in perspective and in a position operative to move the locomotive.

In the accompanying drawings, the numeral 1 denotes, generally, the locomotive. The same is commonly provided with a driver brake lever 2. This driver brake lever 2, the function of which is to set and to release the brake shoes which are applied to the drivers, may be variously mounted. In some instances, the lever 2 is rigidly attached to a shaft 6, and this shaft 6, by its rotation, serves to set the brakes. In other instances, the lever 2 is journaled for rotation upon the member 6 intermediate its ends, the lower end of the lever carrying a suitable connecting element 7 whereby the brakes may be set. In either instance, it is the common practice to operate the lever 2 by means of a piston rod 4 and a brake cylinder 3, the same being operable by fluid pressure means.

In constructing a driver brake lever in accordance with my invention, I provide the same upon its forward edge and above the pivotal connection 6 with a forwardly projecting shoulder 8. The lower terminal of the lever I bevel, as denoted by the numeral 9, to form a second shoulder, the faces of the shoulders, as clearly shown in Fig. 1, being disposed at an angle to each other, one facing rearwardly and one facing forwardly. The beveled portion 9 and the lower face of the shoulder 8 may be roughened or serrated, as denoted by the numeral 10, in order to retain a strut 11, which is interposed between the lever 2 and the track upon which the locomotive rests.

The practical operation of the device is as follows:—When a locomotive is found to be upon dead center, as hereinbefore described, the strut 11 may be disposed as shown in Fig. 2, the same engaging the shoulder 8 at one end and a cross-tie or some other rigid support at its lower terminal. When the piston rod 4 is moved in the cylinder 3 by any suitable fluid pressure means as is commonly done in working the brakes, the lever 2 fulcruming at 6 will, through the shoulder 8, engage the strut 11 which is in contact with the track, and move the locomotive rearward a few inches, throwing the parts off center. It is obvious, that, if desired, the strut 11 may be interposed between the beveled terminal 9 of the lever 2 and the track, whereupon, when the said lever 2 is moved, as hereinbefore described, the locomotive will be thrust forward, instead of rearward. It is to be understood that the movement imparted to the locomotive need be but slight, and this movement will take place before the lever 2 has moved to a sufficient extent to set the braking mechanism.

Having thus described my invention, what I claim as new, and desire to protect, by Letters Patent, is:—

1. The combination with the driver brake lever of a locomotive, of means operable by said lever for moving the locomotive.

2. The combination with the driver brake lever of a locomotive, of means operable by said lever for moving the locomotive independently of the means for turning the driving wheels thereof.

3. The combination with the driver brake lever of a locomotive, of means operable by said lever for moving the locomotive independently of the motive mechanism of the locomotive.

4. In a locomotive, a track-engaging strut, and a driver brake lever to engage said strut.

5. In a locomotive, a track-engaging strut, and a driver brake lever arranged to receive the terminal of the strut.

6. In a locomotive, a track-engaging strut, and a driver brake lever having a shoulder to engage the strut.

7. In a locomotive, a track-engaging strut, and a driver brake lever having a shoulder to engage the strut, the face of the shoulder being roughened to provide a frictional hold for the strut.

8. In a locomotive, a driver brake lever having forwardly and rearwardly facing shoulders; and a track-engaging strut receivable successively by each of said shoulders.

9. In a locomotive, a driver brake lever and track-engaging means receivable by the end of the lever for moving the locomotive.

10. In a locomotive, a driver brake lever having a projecting shoulder, and track-engaging means receivable by said shoulder for moving the locomotive.

11. In a locomotive, a driver brake lever pivoted intermediate its ends to the locomotive and being provided upon one side with a shoulder; and track-engaging means receivable successively by the terminal of the lever and by the shoulder, for moving the locomotive in opposite directions.

12. In a locomotive, a driver brake lever; means for operating the lever; and track-engaging means operatively connected with the lever, whereby the locomotive may be moved upon the movement of the lever.

13. In a locomotive, a driver brake lever having a forwardly facing shoulder and being terminally beveled to present a rearwardly disposed face; and track-engaging means arranged to be successively received by the shoulder and the beveled terminal.

14. In a locomotive, a driver brake lever having beveled rearwardly and forwardly disposed faces; and track-engaging means adapted to be engaged successively by the faces.

15. In a locomotive, a lever pivoted to the locomotive; fluid pressure means for operating the lever; and a removable track-engaging strut arranged to be engaged by the lever.

16. In a locomotive, a driver brake lever having a forwardly projecting shoulder; and track-engaging means arranged to be engaged by the shoulder.

17. In a locomotive, a driver brake lever having a beveled lower terminal; and track-engaging means arranged to be engaged by the terminal.

18. In a locomotive, a driver brake lever having a forwardly projecting shoulder and being terminally beveled to present a rearwardly disposed face; the shoulder and the face being roughened; and track-engaging means arranged to be received successively by the shoulder and the face.

19. The combination with the driver brake lever of a locomotive, of support engaging means operable by said lever for moving the locomotive.

20. In a locomotive, a support-engaging strut, and a driver brake lever to engage said strut.

In testimony that I claim the foregoing as my own, I have hereto affixed my signature in the presence of two witnesses.

JAMES A. TAYLOR.

Witnesses:
H. W. GREGORY,
W. C. COLVIN.